(12) United States Patent
Stuttgen et al.

(10) Patent No.: US 9,936,822 B2
(45) Date of Patent: Apr. 10, 2018

(54) GARNISH DISPENSER

(71) Applicant: Tablecraft Products Company, Inc., Gurnee, IL (US)

(72) Inventors: Joseph M. Stuttgen, Stanley, WI (US); Andrew J. Janetski, Eau Claire, WI (US); David J. Keyes, Eau Claire, WI (US); Tyler P. Buchanan, Chippewa Falls, WI (US); Charlene D. Nelson, Elk Mound, WI (US)

(73) Assignee: TABLECRAFT PRODUCTS COMPANY, INC., Gurnee, IL (US)

( * ) Notice: Subject to any disclaimer, the term of this patent is extended or adjusted under 35 U.S.C. 154(b) by 0 days.

(21) Appl. No.: 15/214,512

(22) Filed: Jul. 20, 2016

(65) Prior Publication Data

US 2018/0020844 A1   Jan. 25, 2018

(51) Int. Cl.
| | |
|---|---|
| B65G 59/00 | (2006.01) |
| B65H 1/00 | (2006.01) |
| A47F 1/04 | (2006.01) |
| B65D 83/08 | (2006.01) |
| B65D 85/62 | (2006.01) |

(52) U.S. Cl.
CPC ............ *A47F 1/04* (2013.01); *B65D 83/08* (2013.01); *B65D 85/62* (2013.01)

(58) Field of Classification Search
CPC ........... A47F 1/04; B65D 83/08; B65D 85/62; B65D 85/63
USPC .............................. 221/92; 312/328; 206/594
See application file for complete search history.

(56) References Cited

U.S. PATENT DOCUMENTS

| | | | | |
|---|---|---|---|---|
| 1,947,227 | A * | 2/1934 | Ritter, Jr. ............... | A45C 13/03 206/298 |
| 4,735,228 | A * | 4/1988 | Boedecker .......... | A47L 15/4436 137/268 |
| 5,101,972 | A * | 4/1992 | Hunt .................... | A47B 81/068 206/308.1 |
| 5,345,153 | A * | 9/1994 | Vaught ............... | A47G 33/0809 248/915 |
| 6,471,312 | B1 * | 10/2002 | Coffey ..................... | E05F 5/10 312/319.2 |
| 8,360,306 | B2 * | 1/2013 | Vroon .................... | B65D 25/04 229/120.07 |
| 8,517,214 | B2 * | 8/2013 | Lowry .................... | A47F 1/082 221/124 |
| 2002/0162847 | A1* | 11/2002 | Roy .......................... | A47F 1/08 221/34 |
| 2004/0050750 | A1* | 3/2004 | Hannan ................ | A61G 12/001 206/570 |
| 2004/0168954 | A1* | 9/2004 | Hannan ................ | A61G 12/001 206/594 |
| 2005/0082307 | A1* | 4/2005 | Tucker .................... | A47F 1/065 221/67 |

(Continued)

*Primary Examiner* — Rakesh Kumar
(74) *Attorney, Agent, or Firm* — Pearne & Gordon LLP

(57) ABSTRACT

A self-replenishing garnish dispenser comprising a carrier base and a plurality of separate bins receivable in the carrier base, the carrier base having a horizontally elongated channel for receiving and aligning bins side-by-side, each bin having walls forming a J-shaped space open at an upper end and a mid-height open end, the bin space being adapted to temporarily store condiments or garnish pieces received at the open upper end and dispensed at the mid-height end.

3 Claims, 4 Drawing Sheets

(56) References Cited

U.S. PATENT DOCUMENTS

| | | | |
|---|---|---|---|
| 2008/0190914 A1* | 8/2008 | Gibson | A47J 39/006 219/689 |
| 2012/0091163 A1* | 4/2012 | Lowry | A47F 1/082 221/1 |
| 2013/0306668 A1* | 11/2013 | Lowry | A47F 1/082 221/1 |
| 2013/0337129 A1* | 12/2013 | Purgatorio | A47J 39/006 426/394 |
| 2017/0305350 A1* | 10/2017 | Sakai | B60R 1/06 |

* cited by examiner

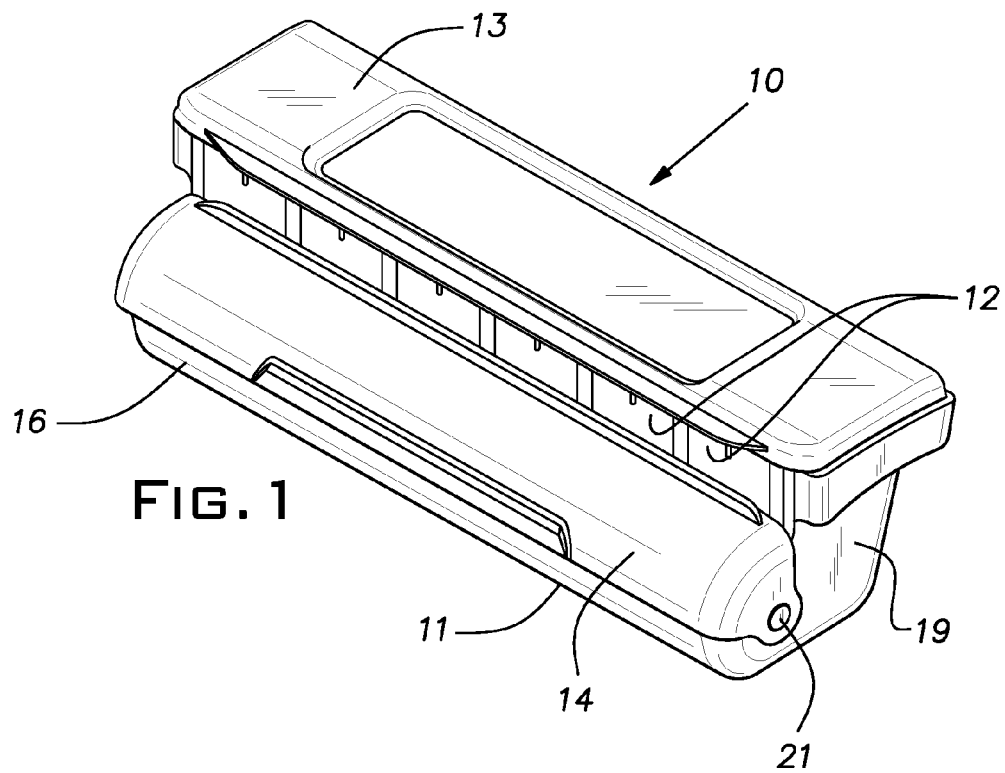
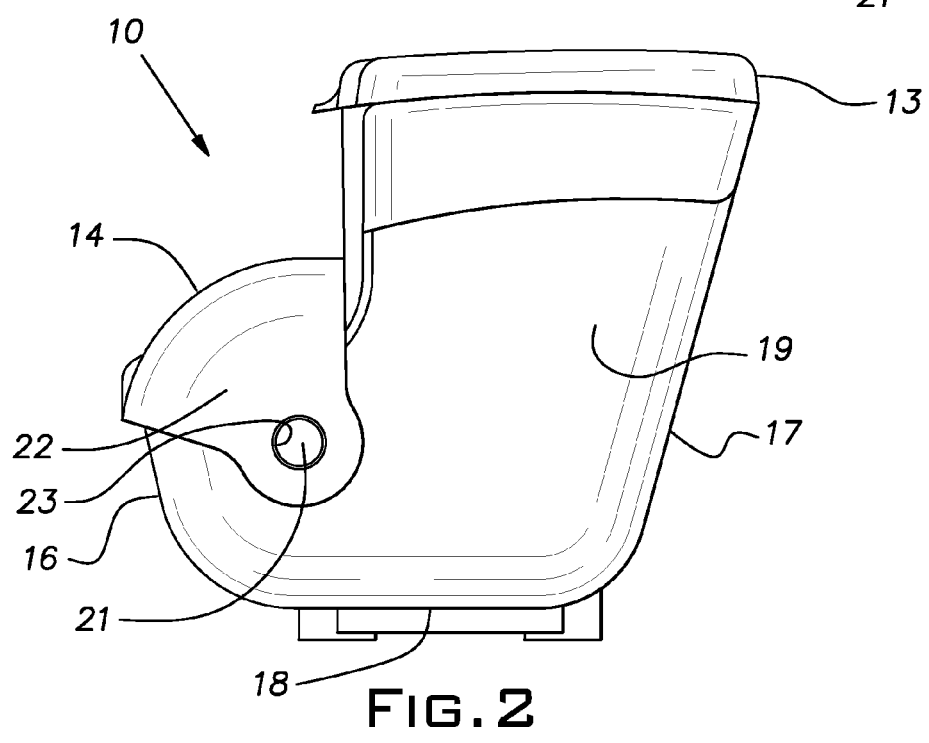

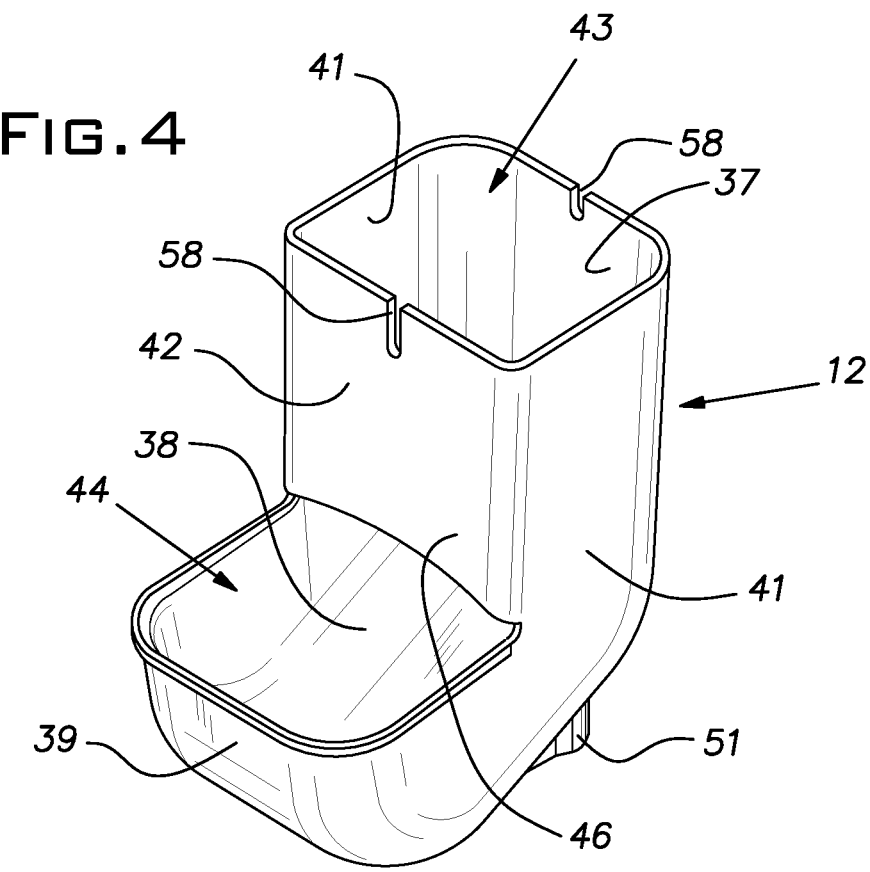
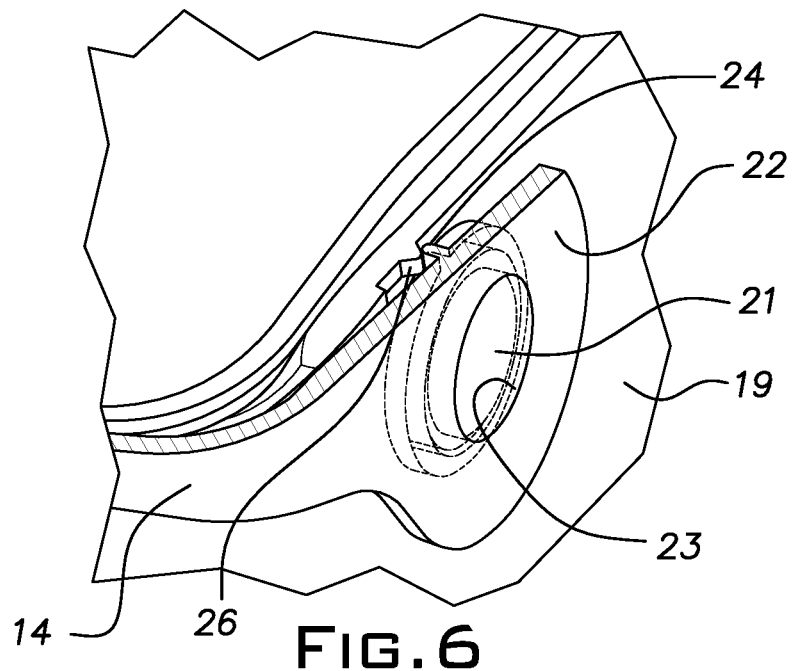

GARNISH DISPENSER

BACKGROUND OF THE INVENTION

The invention relates to a food service device for organizing and dispensing a plurality of condiments and garnishes.

Food service establishments including restaurants, bars, cafeterias, event centers and the like have a need for a unit capable of individually storing and dispensing a variety of condiments and garnishes. Ideally, the unit can be used by employees or patrons depending on the nature of the food service establishment.

Preferably, a dispensing unit should serve to subtly discourage people, especially patrons, from withdrawing excessive portions of a particular item or items from the unit. The unit should permit an individual condiment or garnish to be restocked without disturbing the condition or presentation of the other condiments or garnishes dispensed in the unit. Major and individual parts of the unit should be easily sanitized by washing and rinsing after use.

SUMMARY OF THE INVENTION

The invention provides a dispenser, including a carrier base and a bank of self-replenishing garnish/condiment bins. The disclosed bins preferably have a J-shaped configuration. Each bin is arranged to be filled at an upper end inlet opening and to dispense at a mid-level outlet or dispensing opening. As portions of a garnish or condiment product are removed from the dispensing opening, a replacement quantity, under the influence of gravity, can automatically descend from a supply column of the product under the fill opening and migrate towards the dispensing opening.

The bins are separate containers that can be removed from the carrier base without disturbing other bins and be replaced with another bin or itself be refilled and returned to the carrier base.

The carrier base has a single cover for the bin fill openings and another separate cover for the bin dispensing openings. When closed, the covers exclude airborne contaminants, maintain freshness, and help keep the condiments and garnishes chilled. A panel in the carrier base establishes a chamber than can be filled with ice to maintain freshness of perishable goods in the bins.

The bin configuration presents a limited apparent volume of a condiment or garnish at the dispensing opening as compared to its actual storage volume. This arrangement has the subtle effect of reducing waste by discouraging users, particularly in self-service applications, from dispensing excessive portions.

BRIEF DESCRIPTION OF THE DRAWINGS

FIG. 1 is a perspective view of the inventive garnish dispenser;

FIG. 2 is a right side elevational view of the garnish dispenser;

FIG. 4 is a perspective view of a typical bin;

FIG. 6 is an enlarged fragmentary perspective view of a pivot area of one end of a lower cover of the dispenser.

DESCRIPTION OF THE PREFERRED EMBODIMENT

Figure 3:
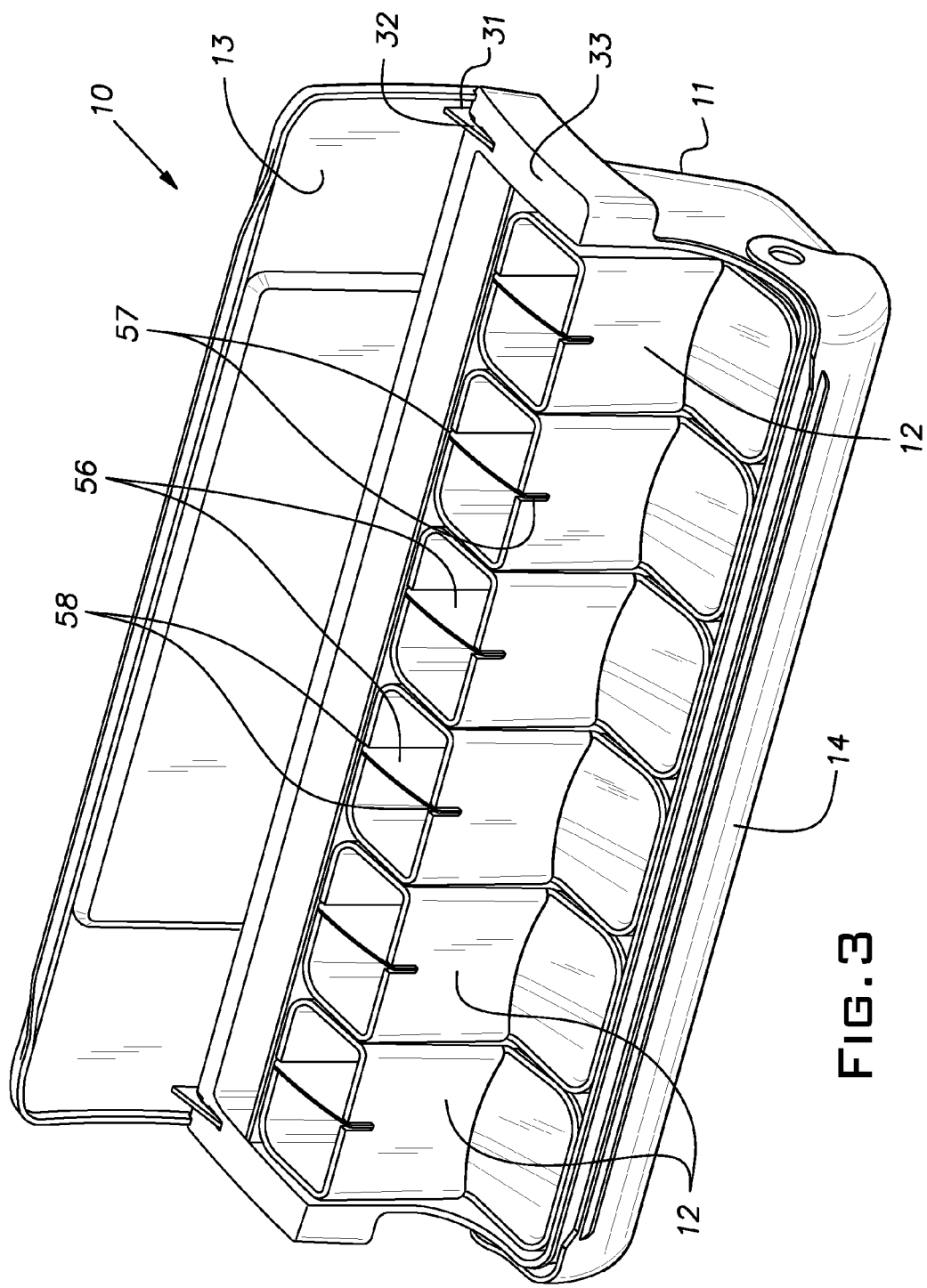
FIG. 3 is a perspective view of the garnish dispenser with its covers open exposing a plurality of individual bins.

A multi-compartment dispenser 10 for condiments and garnishes is an assembly of injection molded plastic parts. The parts may be made of a suitable thermoplastic such as rigid polyvinylchloride. The dispenser 10 includes an elongated carrier base 11 in which are removably positioned separate bins 12. An upper cover 13, when closed, overlies rearward portions of the bins 12 and a lower cover 14, when closed, overlies forward portions of the bins. By way of example, and for scale purposes, the carrier base can have a length of approximately 20 inches.

Figure 5:
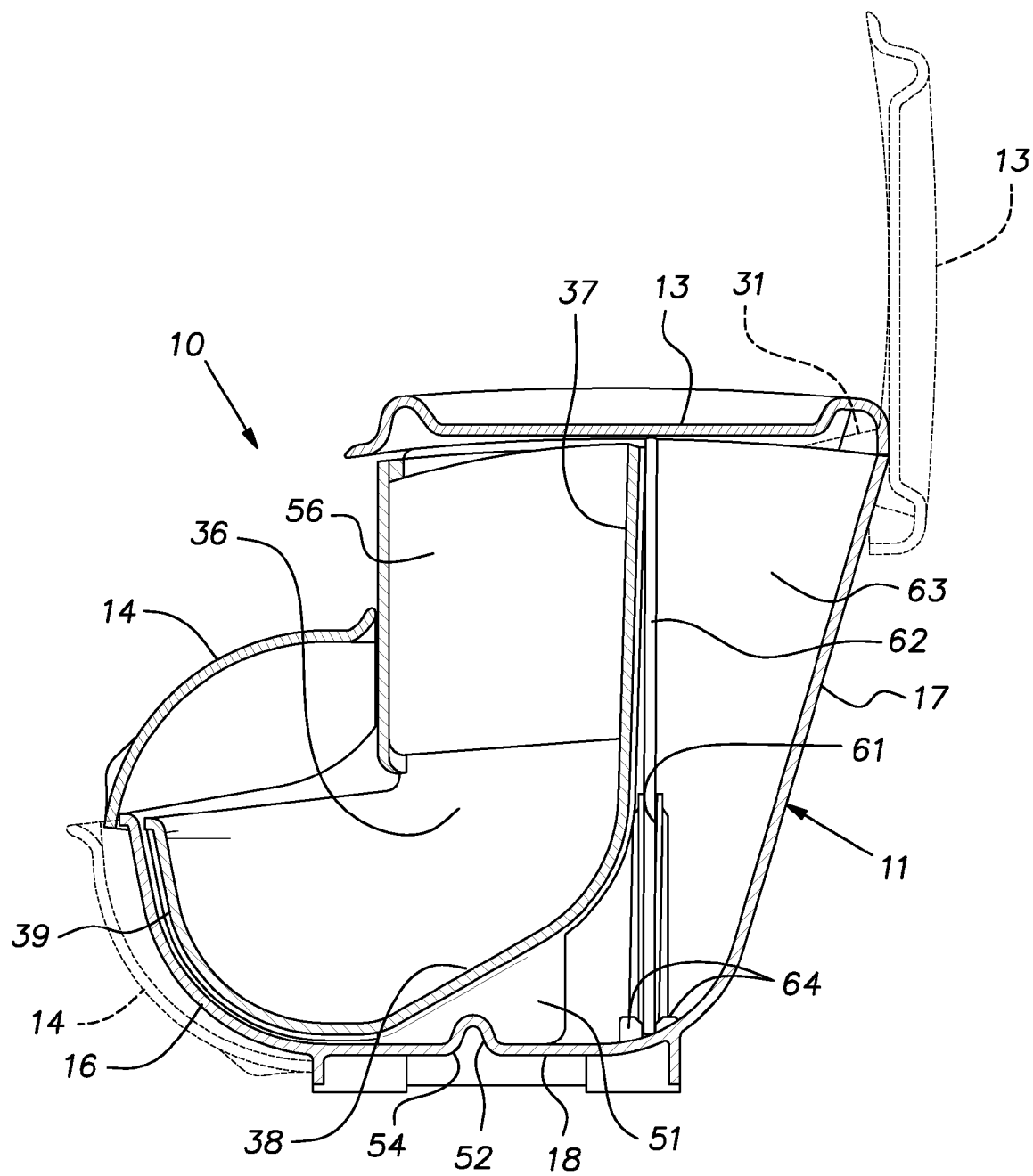
FIG. 5 is a cross-sectional view of the dispenser in a vertical plane transverse to a lengthwise direction of the dispenser.

The carrier base 11 is a unitary part having a channel shaped cross-section, shown in FIG. 5 with front and rear sidewalls 16, 17, respectively, joined by an intermediate bottom wall 18. The channel formed by the walls 16-18 is closed by end walls 19. Preferably, corners formed by intersections of the walls 16-19 have large radii to facilitate cleaning and rinsing.

The end walls 19 have an integral circular stub 21 that forms a trunnion mount or pivot for opposed ends 22 of the lower cover 14. The cover ends 22 have circular holes 23 that fit on respective stubs 21. The main length of the cover 14 is a cylindrical wall segment with an arcuate center concentric about an axis passing through the center of the circular holes 23. The cover 14, which is preferably an injection molded unitary part, has sufficient elasticity to enable the ends 22 to snap over the stubs 21 to effect assembly of the cover onto the carrier base 11.

As seen in FIG. 6, one or both cover ends 22 has a molded inward projection 24 that cooperates with an outward projection 26 molded on the carrier base end wall 19 to releasably hold the lower cover 14 in the closed position depicted in FIG. 2. When the lower cover 14 is manually moved to and from the closed position, the interference between the projections 24, 26 is overcome by a caroming action between these elements in which the cover end wall 22 resiliently deflects outwardly in the longitudinal direction of the carrier base, i.e. parallel to the axis of the pivot stub 21. The open position of the cover 14 is illustrated in broken line in FIG. 5.

The upper cover 13 is generally rectangular in top view and has the general configuration of an inverted shallow rectangular pan. A depending hook 31 on the underside of the cover 13 at each of its ends towards the rear is assembled in an associated slot 32 in a top ledge 33 of the carrier base 11. The cover 13 is manually pivoted on the hooks 31 relative to the carrier base 11 between closed (FIG. 5, solid line) and open (FIG. 5, broken line) positions.

The illustrated dispenser 10 is provided with six separate identical bins 12. Other arrangements of the invention can use more or fewer bins. A bin 12 being an injection molded unitary part, has thin walls that form the boundary of a J-shaped interior space 36. The wall elements of a bin 12 include a back 37, bottom 38, front 39, sides 41, and intermediate wall element 42. For the most part, except for the bottom 38, the walls are generally vertical. The bottom wall 38 is sloped downwardly from the rear towards the front. Intersections of the walls 37, 42 are curved to facilitate movement of condiments/garnish and for cleaning and for washing.

Upper edges of the back, side and intermediate walls, 37, 41 and 42, respectively, form an inlet opening 43 for receiving condiment or garnish pieces. An upper edge of the front wall 39 and adjacent edges of the sidewalls 41 form an outlet 44 for dispensing condiment or garnish pieces. A lower edge of the intermediate wall 42 allows the pieces to pass from a columnar space below the inlet 43 to a space below the outlet 44. Combined, these two spaces have the configuration of the letter J when seen in an imaginary vertical plane.

Ribs 51 on the underside of the bottom wall 38 have a notch 52 that fits over a longitudinal inverted raised channel 53 in the bottom wall 18 of the carrier base 11. When the notches 52 are mated with the channel 54, a bin 12 is properly located in the carrier base 11.

Planar bin dividers 56 (FIG. 3) are optionally used in one or more bins 12 to increase the variety of the condiments/garnishes that are served in the dispenser 10. A bin divider 56 fits closely in the space below the inlet 43 downwardly to a level adjacent that of the outlet opening 44. The bin divider 56 is suspended in a bin 12 by integral tabs 57 located in slots 58 in the upper edges of the rear and intermediate walls 37, 42, respectively.

On the interior of the carrier base end walls 19 are oppositely facing vertical channels 61. A planar divider 62 extending the length of the carrier base interior is optionally located in the channels to separate the interior into two chambers. The bins 12 occupy a front chamber while a rear chamber indicated at 63 can be filled with ice to maintain the contents of the bins 12 chilled. A bottom edge of the divider 62 is located by small spaced pins 64 molded on the carrier base bottom wall 18 in staggered positions to hold the divider from both sides.

A bin 12 can be filled with pieces of a desired condiment or garnish while the bin is removed from the carrier base or while it remains in the base. Ordinarily, the condiment/garnish is put in a bin 12 through the upper inlet opening 43 until level with the opening. As the bin is being filled, the condiment/garnish guided by the bottom wall 38 and influenced by gravity will automatically move to the front part of the bin below the dispensing opening 44. If desired, the front part of the bin can be filled at least partially through the dispensing opening 44. A person can dispense condiment or garnish through the opening 44 using a spoon or other utensil. As the condiment/garnishment is dispensed from the opening 44, it is replenished by the influence of gravity on the column of condiment/garnish beneath the fill opening 43. The weight of the column causes the condiment/garnishment to automatically slide over the inclined bottom wall 38 to the space beneath the dispensing opening 44. Passage of the condiment or garnish through the J-shaped volume of the bin 12 assures that the oldest stored part of the condiment/garnishment in a dispensing bin will be the first to be dispensed.

The covers 13, 14, when closed, keep the condiment/garnish fresh and protected from airborne contaminants. The carrier base chamber 63 can be filled with ice to chill the goods in the bins 12. The divider 62 can be made from aluminum sheet to facilitate heat transfer between the chambers. The geometry of the pivot hooks 31 permit the upper cover 13 to rest in an open, generally vertical position. The lower cover 14 in its pivoted open position, shown in FIG. 5 in broken line, underlies the forward part of the carrier base 11 and bins 12 so that counter or table space occupied by the dispenser 10 remains small.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A self-replenishing garnish dispenser comprising a carrier base and a plurality of separate bins receivable in the carrier base, the carrier base having a horizontally elongated channel for receiving and aligning bins side-by-side, each bin having walls forming a J-shaped space open at an upper inlet end and open at a mid-height end forming dispensing opening, the bin space being adapted to temporarily store condiments or garnish pieces received at the open upper inlet end and dispensed at the mid-height end, the carrier base including a single cover, pivotally mounted to side walls of the carrier base, for covering the mid-height dispensing opening of the plurality of bins, the cover of the mid-height dispensing openings of the bins being arcuate in cross-section and when the cover is in an open position having a portion disposed beneath the mid-height openings.

2. A self-replenishing garnish dispenser comprising a carrier base and a plurality of separate bins receivable in the carrier base, the carrier base having a horizontally elongated channel for receiving and aligning bins side-by-side, each bin having walls forming a J-shaped space open at an upper inlet end and open at a mid-height end forming dispensing opening, the bin space being adapted to temporarily store condiments or garnish pieces received at the open upper inlet end and dispensed at the mid-height end, including bin dividers proportioned to be received in the upper inlet end and extending partially downwardly into the horizontally elongated channel to an interior level adjacent the dispensing opening of a bin and spaced above a bottom of a bin.

3. A self-replenishing garnish dispenser as set forth in claim 2, wherein a bin divider is suspended in a bin by integral tabs located in slots in upper edges of rear and intermediate walls of a bin.

* * * * *